June 30, 1925.

O. F. HUNZIKER 1,543,853

APPARATUS FOR DEODORIZING CREAM

Filed July 27, 1921 2 Sheets-Sheet 1

Inventor
Otto F. Hunziker
by Clarence E. Mehlhop, Atty.

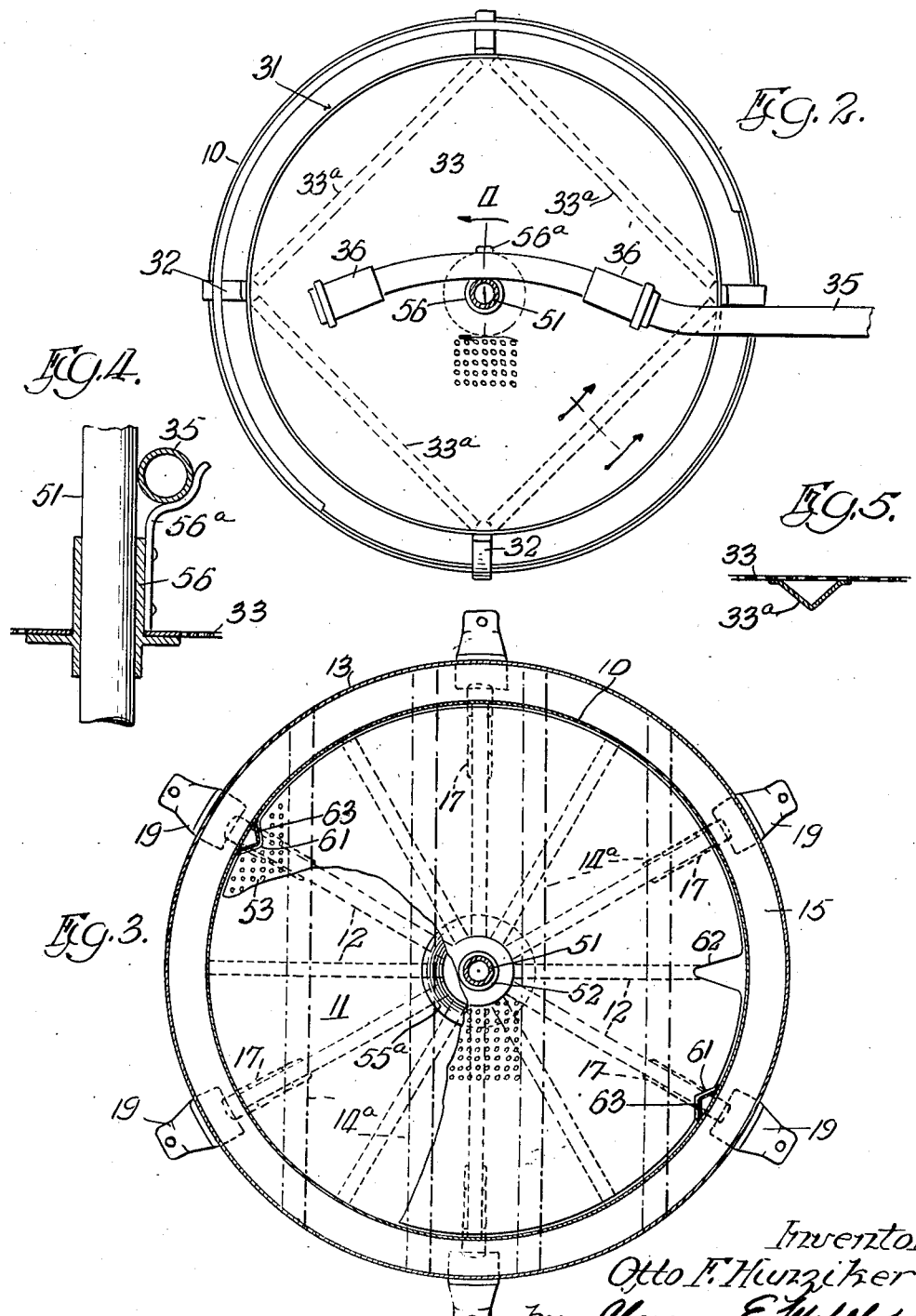

Patented June 30, 1925.

1,543,853

UNITED STATES PATENT OFFICE.

OTTO F. HUNZIKER, OF LA GRANGE, ILLINOIS, ASSIGNOR TO THE PFAUDLER CO., OF ROCHESTER, NEW YORK, A CORPORATION OF NEW YORK.

APPARATUS FOR DEODORIZING CREAM.

Application filed July 27, 1921. Serial No. 487,913.

*To all whom it may concern:*

Be it known that I, OTTO F. HUNZIKER, a citizen of the United States, and a resident of La Grange, county of Cook, and State of Illinois, have invented certain new and useful Improvements in Apparatus for Deodorizing Cream; and I do hereby declare that the following is a full, clear, and exact description thereof, reference being had to the accompanying drawings, and letters of reference marked thereon, which form a part of this specification.

This invention relates to a novel and improved apparatus for deodorizing cream, milk and other butter fat containing liquids and consists of the matters hereinafter described and more particularly pointed out in the appended claims.

It has been found that cream and milk in some periods of the year and more particularly in some sections of the country, has an objectionable flavor and odor, such as the flavor and odor of onion or garlic, or of yeast or other flavors and odors which make them objectionable for use in butter making or for other purposes. It has long been attempted to remove such flavors and odors, but so far no commercially practicable apparatus has been found by means of which to completely and thoroughly remove such flavors and odors.

In an application for patent executed of even date herewith, I have described a novel process for completely removing such flavors and odors from cream or milk and the object of the present invention is to provide a novel and improved apparatus, capable of operation on a commercial scale, for carrying out said process.

The improved apparatus is of simple and economical construction, is of the greatest efficiency in operation and has many advantages which will be manifest to those familiar with the art and will appear fully as I proceed with my specification.

In the drawings:—

Fig. 1 is a view partly in elevation and partly in vertical section, of an apparatus embodying my invention.

Fig. 2 is a top plan view of the apparatus.

Fig. 3 is a horizontal sectional view through the apparatus, taken on the line 3—3 of Fig. 1.

Figs. 4 and 5 are vertical detail sectional views, on an enlarged scale, taken on the lines 4—4 and 5—5 respectively of Fig. 2.

Referring now in detail to that embodiment of the invention illustrated in the accompanying drawings: 10 indicates an open top cylindrical tank having a concave bottom wall 11. This tank is adapted to hold the body of cream during the process of aeration. To strengthen the bottom wall 11, I provide on the outer bottom surface thereof, a plurality of radially arranged bracing strips 12.

The tank 10 is set in a second tank 13 having a flat bottom wall 14, a space being left between the two tanks to provide a water or steam jacket 15 which surrounds the bottom and sides of the tank 10 and extends almost to the top of the same. The water jacket is as shown herein closed at its top end by a conical band or wall 16. The tank 10 is supported at its bottom by means of brackets 17 resting upon the bottom wall of the tank 11 which in turn is supported in a position above the floor 18 by legs 19. The bottom wall 14 of the tank 11 is braced by angle bars 14ª.

The water jacket 15 is supplied with hot water or steam by an inlet pipe 20 entering through the conical wall 16 at the side of the tank. The inlet pipe has an orifice 21 so arranged as to direct the hot water or steam circumferentially about the tank 10 and the water or steam is discharged from the jacket space by an outlet pipe 22 at the bottom on the opposite side of the tank 10. The outlet pipe 22 has an orifice 23 directed in such manner as to receive the water or steam as it circulates circumferentially and downwardly about the tank 10. The pipe 22 leads back and is connected to the pipe 20. In the pipe 22 is interposed a steam pump or lift 24 of the noiseless type which is fed from a steam pipe 25— thus establishing a continuous circulation of hot water or steam in and through the jacket.

Near the inlet pipe 20 is an overflow pipe 26 and leading from the bottom of the water jacket is a drain pipe 27 having a shut-off valve 28. A thermometer 29 is suitably supported in the wall of the tank 13 for observation of the temperature of the water in the jacket space, and a second thermometer 30 is also provided, having its end projected into the cream tank for observation of the temperature of the cream in said tank.

31 indicates a pan located vertically above the tank 10; said pan is supported by legs 32 of a length to leave a substantial space between the tank and the pan. The pan has a perforated bottom wall 33 and an inwardly and downwardly tapering flange or apron 34. The bottom wall is strengthened on its underside by hollow, V-ribs 33$^a$. The bottom ends of the legs 32 have clips 32$^a$ which rest upon the top edge of the tank 10, so that the pan and legs may be removed from the tank for the purpose of cleaning. A horizontally disposed feed-pipe 35 extends substantially across the pan 31, said pipe having downwardly directed discharge nozzles 36, which preferably discharge upon spreading devices 37 fixed to the perforated bottom wall 33 of the pan 31. These spreading devices act to spread the fluid discharged from the nozzles 36 over the bottom of the pan. The pipe 35 is connected by branch pipes 38—39 with an outlet pipe 40 connected with the bottom of the tank 10 at its center. A stuffing box 40$^a$ is provided where the pipe 40 passes through the bottom wall 14 of the tank 11. Said pipes 35—38—39 and 40 are for the purpose of drawing cream from the bottom of the tank 10 and discharging it into the pan 31. A cream pump 41 of suitable construction is interposed between the pipes 38—39 for withdrawing the cream and for elevating it to a point above the pan. In the pipes 39 and 40 are provided suitable shut-off valves 42—43.

The pipe 35 is connected with still another branch pipe 44 which leads to a cooling vat (not shown). A three-way valve 45 at the junction of the pipes 35—38 and 44 controls the flow of cream in such manner as to divert it from the pipe 38 into either one of the pipes 35—44.

Leading from the pipe 38 are two short by-pass pipes 46—47 which connect with the top and bottom ends of a pasteurizer 48 of the "flash" type. In the pipe 38 between the by-passes 46—47 is a shut-off valve 49 and in the by-pass pipes are shut-off valves 46$^a$—47$^a$ respectively. By means of these valves, a part of the cream or all of the cream delivered into the pipe 38 by the pump 41 may be made to pass through the pasteurizer 48. In the various pipes before mentioned are provided suitable union fittings so that the pipes may be disconnected for a thorough cleaning.

Means are provided for producing a current of air horizontally through the space between the top of the tank 10 and the bottom of the pan 31 for the purpose of aerating the cream falling like rain or spray from the pan into the tank. Preferably a fan 50 is used to give a current of air of large volume as distinguished from a blower. To supplement the action of the fan, a hood (not shown) may be installed in close proximity to the side of the tank 10, directly opposite the fan 50, with a conduit and suction pump to assist in removing the vapors arising from the tank 10. The flange or apron 34 of the pan before referred to, prevents the cream from being blown outwardly beyond the top of the tank 10.

51 indicates a vertically disposed pipe which leads centrally down through the pan 31 and into the tank 10 where its bottom end terminates in a flanged collar 52 secured to a perforated false bottom wall 53 at the bottom of the tank. This false bottom wall is of a diameter slightly less than that of the tank 10 and includes a depending flange 54 which is formed to provide a plurality of notches 55, about the periphery of the false bottom wall. Located immediately below the bottom end of the pipe 51 and supported in a position above the bottom wall 11 of the tank is a saucer-shaped spreading disc 55$^a$ against which the air is discharged from the bottom end of the pipe 51 and by which it is forced out and spread radially in the space below the false bottom wall 53 so as to direct innumerable jets of air spaced at near intervals upwardly through the cream in the vat.

The top end of the pipe 51 extends through and is secured in a flanged collar 56 fixed to the bottom wall of the pan 31 and associated with this collar is a strap 56$^a$ (see Fig. 4), the collar and strap acting to removably support the pipe 35 at this point. A strap eye 57 fixed to one of the legs 32 acts to assist in the support of the pipe 35. The top end of the pipe 51 is connected to a leader 58 to the other end of which is secured an air strainer and cleaner 59. In the leader is interposed a blower 60 capable of supplying large volumes of air under pressure, the inlet and outlet openings of the blower, as shown, being diametrically opposite. In the pipe 51 are suitable union fittings so that the said pipe may be taken apart when it is desired to clean the same, or to clean the interior of the tank 10 and its false bottom wall 53.

To facilitate the removal and replacement of the false bottom wall, the same is provided in its periphery with a plurality of notches 61—61 and 62 (see Fig. 3). The notches 61—61 are arranged diametrically opposite to each other and receive guide ribs 63 on the inner surface of the tank 10 while the notch 62 is aligned with respect to the end of the cream thermometer, 30, so that said thermometer end will not interfere with the withdrawal of said bottom wall.

The operation of the apparatus is as follows: The cream or other butter fat containing or other liquid to be treated is first heated to not less than 140° F.,—that temperature or one somewhat above, being the temperature at which the butter fat will most readily release the most objectionable volatile flavors and odors. It is then introduced into the tank 10.

The pump 41 is put into operation to draw the cream from the tank 10 through the pipes 40, 39 and to elevate it through the pipe 38 and discharge it through the pipe 35 and the nozzles 36, 36 into the pan 31. From the pan 31 it falls through the perforated bottom 33 of said pan in the form of a fine rain or spray which descends upon the surface of the body of cream in the tank 10. The blower 60, supplying air in great volume and under high pressure is then started. The air therefrom is driven through the pipe 58 and down through the pipe 51, from the bottom end of which it is discharged against the spreader 55ª. Said spreader directs the air blast horizontally in all directions in the space below the false bottom 53 whence it is forced upwardly through the perforations in said false bottom in the form of innumerable jets or sprays spaced at near intervals throughout a horizontal section of the body of cream in the tank 10. The said air jets or sprays escape above the surface of the body of cream and ascend through the descending rain of cream falling from the pan 31. At the same time, the fan or blower 50 is put in operation to blow a horizontal current of air through the space between the pan 31 and the tank 10, thus subjecting the falling rain of cream to a current of air at an angle to the direction of its fall. In the meantime hot water or steam is supplied to the jacket 15 so as to maintain the body of cream in the tank 10 at a temperature of not less than about 140° F.

It is important for the best results to design the cream pump 41 and the heating arrangements so that the circulation of cream from the tank 10 to the pan 31 and the return thence in rain to the said tank may be maintained at a comparatively rapid rate—say a complete circulation every five minutes, for example—so that as large a part as possible of the body of cream under treatment may be at all times descending as rain or as a shower, since it is when the cream is in this finely divided state that the most objectionable odors and flavors are most quickly and efficiently removed by the air. In this connection the butter fat, to which the strongest odors and flavors cling, is most effectively exposed to the deodorizing action of the air.

On account of the great volume of air required to pass through the cream in the tank 10, (preferably a volume in excess of one-fifth of a cubic foot per gallon of cream per minute) and as it is difficult to heat such a volume of air sufficiently to prevent it from lowering the temperature of the cream below the aforesaid required temperature, it is expedient to apply heating means additional to that given by the steam or water in the jacket 15. To this end a part of the cream is preferably passed through the flash pasteurizer 48 by means of the by-pass pipes 47ª, 46ª. The said pasteurizer heats the part of the cream passing through it, so that when returned to the main body of cream flowing through the pipe 35, the mean temperature of the cream will be raised and the desired temperature thus maintained.

In the continuous circulation of the cream between the tank and the pan as described, the cream is subjected to a continuous process of double aeration; first by the air blown up through the body of cream in the tank and second, by the air blown through the rain of cream descending from the pan. The air jets after they escape above the surface of the body of cream in the tank, rise through the descending rain of cream and the horizontally directed stream of air from the pan 50 passes transversely across said descending rain of cream.

The apparatus is continued in operation as above described until all objectionable odors and flavors have been removed from the cream. This may be determined by tests made from time to time. The time required will depend on the nature and degree of the flavor and odor to be extracted, and will ordinarily amount to from about fifteen minutes to an hour.

The rain from the pan by falling on the surface of the cream in the tank obviates or prevents excessive foaming of the body of cream, which would otherwise occur by reason of the violent agitation produced by the air jets forced through the body of cream.

The air supplied by the blower 60, is preferably heated (by means not shown) and said air may, when it is possible to heat it sufficiently, be used to assist or act in maintaining the cream in the tank 10 at the desired temperature.

The air jets forced through the body of cream in the tank, not only aerates the cream, but also agitates it violently and prevents the cream from "oiling off",—maintaining the butter fat in its globular form uniformly distributed through the cream.

I claim as my invention:
1. An apparatus for the purpose described comprising an open-topped container, spray means located above and spaced vertically from the container top, means for continuously withdrawing a liquid from the container and discharging it through said spray means for return by gravity through the air into the container, means for forcing air through the liquid in said container in a plurality of vertically directed jets closely spaced over the horizontal area of the container, and heating means for maintaining the circulating liquid at a predetermined high temperature.

2. An apparatus for the purpose described comprising an open top container, spray means located above and spaced vertically from the container top, means for continuously withdrawing a liquid from the container and for discharging it through said spray means, whence it is returned by gravity through the air into said container, means for forcing air through said container in a plurality of vertically directed jets closely spaced throughout the horizontal area of said container, a fan adapted to direct a current of air transversely through the space between said spray means and container, and heating means for maintaining the circulating liquid at a predetermined high temperature.

3. An apparatus for the purpose described comprising an open top container, a pan having a perforated bottom located above and spaced vertically from the open top of said container, means for continuously withdrawing a liquid from the container and for discharging it into said pan, whence it is returned by gravity to said container through the perforated bottom of the pan, means for forcing air through said container in a plurality of vertically directed jets closely spaced throughout the horizontal area of said container, a jacket surrounding the sides and bottom of said container, and means for continuously circulating a heating fluid in said jacket about said container.

4. In an apparatus for the purpose described in combination with an open top container, a pan with a perforated bottom located above said container, and means for continuously withdrawing a liquid from said container and for discharging it into said pan, a perforated false bottom wall of substantially the horizontal area of said container, an air conduit extending down through said container and opening into the space below said false bottom wall, a spreading device in said space below the discharge opening of said pipe, and means for supplying air under high pressure to said pipe.

5. In an apparatus of the kind described in combination with an open top container, spray means above said container, and means for forcing air upwardly through said container in a plurality of vertically directed jets closely spaced throughout the horizontal area of said container, a liquid conduit and pump for continuously withdrawing liquid from said container and for discharging it through said spray means, a by-pass in said conduit, and a flash pasteurizer interposed in said by-pass.

6. In an apparatus of the kind described in combination with an open top container, a pan with a perforated bottom above said container, a jacket surrounding the sides and bottom of said container, means for circulating a heating fluid through said jacket about said container, and means for forcing air upwardly through said container in a plurality of vertically directed jets closely spaced throughout the horizontal area of said container, a liquid conduit and pump for continuously withdrawing liquid from said container and for discharging it into said pan, a by-pass in said conduit, and a flash pasteurizer interposed in said by-pass.

7. In an apparatus of the kind described in combination with an open top container, a pan with a perforated bottom above said container, and means for forcing air upwardly through said container in a plurality of vertically directed jets closely spaced throughout the horizontal area of said container, a liquid conduit and pump for continuously withdrawing liquid from said container and for discharging it into said pan, a by pass in said conduit, and a heating device interposed in said by-pass.

8. In an apparatus of the kind described in combination with an open top container, spray means above said container, a jacket surrounding the sides and bottom of said container, means for circulating a heating fluid through said jacket about said container, and means for forcing air upwardly through said container in a plurality of vertically directed jets closely spaced throughout the horizontal area of said container, a liquid conduit and pump for continuously withdrawing liquid from said container and for discharging it through said spray means, a by-pass in said conduit, and a heating device interposed in said by-pass.

In testimony that I claim the foregoing as my invention, I affix my signature in the presence of a witness, this 15 day of July, A. D. 1921.

OTTO F. HUNZIKER.

Witness:
F. H. ALFREDS.